(12) United States Patent
Li et al.

(10) Patent No.: US 10,313,987 B2
(45) Date of Patent: Jun. 4, 2019

(54) METHOD AND APPARATUS FOR CONTROLLING POWER

(71) Applicant: NTT DoCoMo, Inc., Tokyo (JP)

(72) Inventors: Anxin Li, Beijing (CN); Huiling Jiang, Beijing (CN)

(73) Assignee: NTT DoCoMo, Inc., Tokyo (JP)

(*) Notice: Subject to any disclaimer, the term of this patent is extended or adjusted under 35 U.S.C. 154(b) by 499 days.

(21) Appl. No.: 15/067,598

(22) Filed: Mar. 11, 2016

(65) Prior Publication Data
US 2016/0270005 A1  Sep. 15, 2016

(30) Foreign Application Priority Data
Mar. 12, 2015  (CN) .......................... 2015 1 0107458

(51) Int. Cl.
| | | |
|---|---|---|
| H04W 52/34 | (2009.01) | |
| H04W 52/24 | (2009.01) | |
| H04W 72/12 | (2009.01) | |
| H04W 52/26 | (2009.01) | |
| H04W 52/14 | (2009.01) | |

(52) U.S. Cl.
CPC ....... H04W 52/346 (2013.01); H04W 52/241 (2013.01); H04W 72/1278 (2013.01); H04W 52/146 (2013.01); H04W 52/262 (2013.01)

(58) Field of Classification Search
None
See application file for complete search history.

(56) References Cited

U.S. PATENT DOCUMENTS

| | | | | |
|---|---|---|---|---|
| 9,867,188 | B2* | 1/2018 | Seyama | H04W 72/0453 |
| 2004/0203442 | A1* | 10/2004 | Krishnan | H04L 25/023 |
| | | | | 455/67.11 |
| 2009/0161611 | A1* | 6/2009 | Kuroda | H04B 7/2656 |
| | | | | 370/329 |
| 2011/0009154 | A1* | 1/2011 | Ishii | H04W 16/08 |
| | | | | 455/522 |
| 2011/0183679 | A1* | 7/2011 | Moon | H04W 72/082 |
| | | | | 455/450 |
| 2012/0238263 | A1* | 9/2012 | Caretti | H04W 16/10 |
| | | | | 455/426.1 |

(Continued)

OTHER PUBLICATIONS

Saito et al., "System-Level Performance Evaluation of Downlink Non-orthogonal Multiple Access (NOMA)", Sep. 2013, IEEE <https://ieeexplore.ieee.org/stamp/stamp.jsp?tp=&arnumber=6666209>.*

(Continued)

*Primary Examiner* — Ayaz R Sheikh
*Assistant Examiner* — Mariela Vidal Carpio
(74) *Attorney, Agent, or Firm* — Harness, Dickey & Pierce, P.L.C.

(57) ABSTRACT

The present disclosure provides a method for controlling a power, comprising: determining an average basic transmission power of all User Equipments (UEs) in a cell in each first resource; for each first resource, determining a UE group scheduled in the first resource and a first transmission power allocation factor corresponding to the UE group according to the average basic transmission power. The present disclosure also provides an apparatus for controlling a power. According to the present disclosure, a base station determines a UE group scheduled in each subband and a transmission power for each UE in the UE group.

13 Claims, 5 Drawing Sheets

(56) References Cited

U.S. PATENT DOCUMENTS

| | | | | |
|---|---|---|---|---|
| 2012/0245752 A1* | 9/2012 | Borrett | ................... | G06Q 10/06 |
| | | | | 700/295 |
| 2012/0300727 A1* | 11/2012 | Kim | ................... | H04W 52/146 |
| | | | | 370/329 |
| 2012/0314665 A1* | 12/2012 | Ishida | ................... | H01Q 21/28 |
| | | | | 370/329 |
| 2013/0003580 A1* | 1/2013 | Kovacs | ............... | H04W 72/082 |
| | | | | 370/252 |
| 2013/0310097 A1* | 11/2013 | Smith | ............... | H04W 72/1205 |
| | | | | 455/509 |
| 2015/0282185 A1* | 10/2015 | Nikopour | .............. | H04L 1/0002 |
| | | | | 370/329 |
| 2016/0014785 A1* | 1/2016 | Benjebbour | ........ | H04W 52/241 |
| | | | | 370/329 |
| 2016/0073382 A1* | 3/2016 | Li | ..................... | H04W 72/1289 |
| | | | | 370/329 |

OTHER PUBLICATIONS

Yuki Endo et al., "Uplink Non-orthogonal Access with MMSE-SIC in the Presence of Inter-cell Interference", Wireless Communication Systems (ISWCS), 2012 International Symposium On, IEEE, Aug. 28, 2012, pp. 261-265.

Xiaohang Chen et al., "Multi-User Proportional Fair Scheduling for Uplink Non-Orthogonal Multiple Access (NOMA)", 2014 IEEE 79th Vehicular Technology Conference (VTC 2014—Spring): Seoul, Korea;May 18-21, 2014, pp. 1-5.

European Search Report dated Jul. 19, 2016.

* cited by examiner

METHOD AND APPARATUS FOR CONTROLLING POWER

This application claims the benefit of priority from Chinese Patent Application, No. 201510107458.1, entitled "method and apparatus for controlling power" and filed on Mar. 12, 2015, the entire content of which is hereby incorporated by reference.

FIELD OF THE DISCLOSURE

The present disclosure relates to a wireless communication system, and more particularly to a method and apparatus for controlling a power in a multiple user transmission system.

BACKGROUND

In a multiple user transmission system, through allocating transmission resources appropriately, data may be transmitted to multiple users simultaneously so as to improve data transmission efficiency. For example, in a Multiple User Multiple Input Multiple Output (MU-MIMO) system, via multiple layers in spatial domain, a base station may serve multiple users simultaneously.

Especially, due to limited spectrum resources, Non-Orthogonal Multiple Access (NOMA) has been more and more focused by people since NOMA is able to greatly improve the spectrum efficiency. The basic idea of NOMA is to perform non-orthogonal transmission at the transmitter, introduce interference proactively, and detect data by a Sequential Interference Cancellation (SIC) technology at the receiver. Although SIC processing may increase complexity at the receiver, the spectrum efficiency can be greatly improved.

SUMMARY

The present disclosure provides a method for apparatus for controlling a power, to improve the system throughput.

According to an example of the present disclosure, a method for controlling a power comprises:

determining an average basic transmission power of all User Equipments (UEs) in a cell in each first resource;

for each first resource, determining a UE group scheduled in the first resource and a first transmission power allocation factor corresponding to the UE group according to the average basic transmission power.

According to an example of the present disclosure, an apparatus for controlling a power comprises:

an average basic transmission power determining module, configured to determine an average basic transmission power of all User Equipments (UEs) in a cell in each first resource; and a scheduling module, configured to for each first resource, determine a UE group scheduled in the first resource and a first transmission power allocation factor corresponding to the UE group according to the average basic transmission power.

DETAILED DESCRIPTION

As described above, NOMA is able to greatly improve the spectrum efficiency, where multiple UEs may share a same part of resources. According to a transmission power control method in the prior art, the total uplink transmission power is determined by a UE with a worst channel state among all the UEs to be scheduled, which may make the inter-cell interference (ICI) caused to the adjacent cell fluctuate greatly. Thus, the accuracy for the adjacent cell to estimate the channel state information (CSI) and select a Modulation and Coding Scheme (MCS) is reduced. Hence, how to optimize the uplink transmission power control in a multiple user transmission system is one of key problems which need to be solved.

Examples of the present disclosure provide a method and apparatus for controlling a transmission power. The method and apparatus can be applied for uplink transmission power control in a NOMA system.

In order to make technical solutions and merits of the present disclosure clearer, the present disclosure will be described in detail in combination with examples and accompanying drawings.

Figure 1:
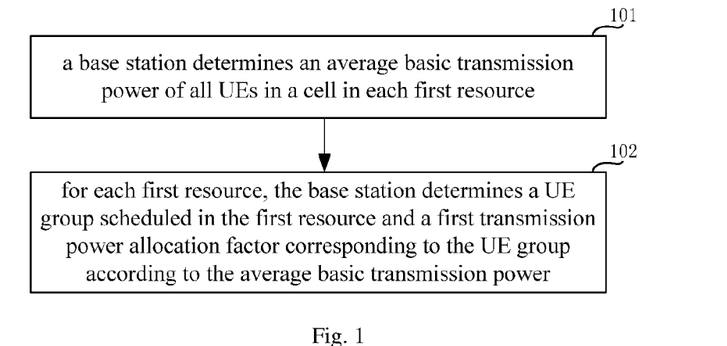
FIG. 1 is a flow chart illustrating a method for controlling a power according to an example of the present disclosure.

FIG. 1 is a flow chart illustrating a method for controlling a transmission power according to an example of the present disclosure. The method can be applied for controlling uplink transmission power in a NOMA system. As shown in FIG. 1, the method includes the following procedure.

In block 101, a base station determines an average basic transmission power Pavg of all UEs in a cell in each first resource.

In an example, the base station may user many methods for determining the average basic transmission power Pavg of all UEs in the cell in each first resource. The first resource may be a subband.

For example, the base station may directly pre-determine an average basic transmission power Pavg of all UEs in the cell in each subband. The average basic transmission power Pavg may be determined according an empirical value or a mean value collected by the base station.

In an example, the first resource is a subband, and the block 101 may be implemented by the following method.

In block 1011, the base station determines a basic transmission power Pbasic of each UE in a cell in each subband.

In an example, the base station may use some Transmission Power Control (TPC) methods proposed in a Long Term Evolution (LTE)/LTE-Advanced (LTE-A) system to determine the basic transmission power of each UE in a cell. For example, a Fractional TPC (FTPC) method specified in LTE/LTE-A Rel.8 version may be used to determine the basic transmission power of each UE in a cell in each subband. In another example, a power control scheme considering the interference from an adjacent cell may also be used for determining a basic transmission power of each UE in a cell in each subband. In specific, the basic transmission power of each UE in a cell in each subband may be set to enable the interference power caused by each UE to all the adjacent cells is lower than a pre-determined threshold.

In block 1012, for each subband, the base station determines an average basic transmission power Pavg of all UEs in a cell according to the determined basic transmission power Pbasic of each UE in a cell in the subband, i.e., the average basic transmission power Pavg of all UEs in a cell is obtained by dividing a sum of the basic transmission power Pbasic of all UEs in the cell in the subband by a number of all UEs in the cell.

In block 102, for each first resource, the base station determines a UE group scheduled in the first resource and a first transmission power allocation factor corresponding to the UE group according to the average basic transmission power Pavg.

In examples of the present disclosure, a set of UEs scheduled in a same resource is called as the UE group. The same resource may include at least one subband.

Figure 2:
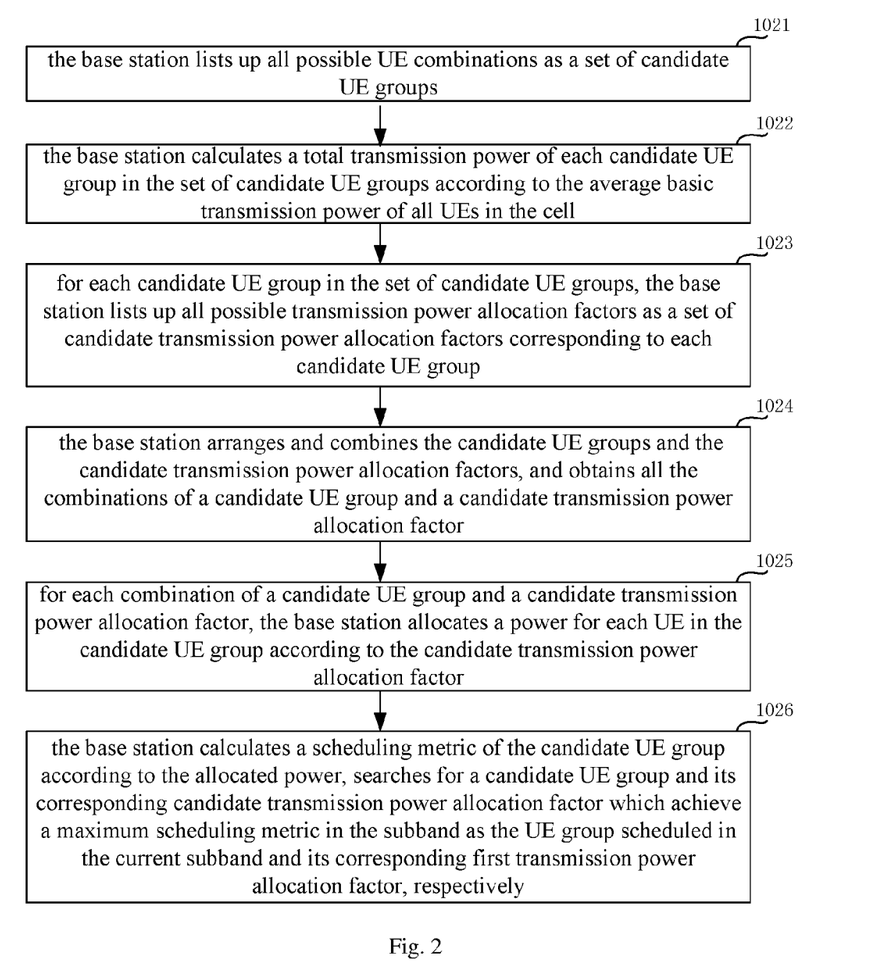
FIG. 2 is a flow chart illustrating a method for determining a UE group scheduled in each subband and a corresponding transmission power allocation factor according to an example of the present disclosure.

According to an example of the present disclosure, the first resource is a subband, and the base station may perform the procedure as shown in FIG. 2 to determine a UE group scheduled in each subband and the first transmission power allocation factor.

In block 1021, the base station lists up all possible UE combinations as a set of candidate UE groups.

In block 1022, the base station calculates a total transmission power of each candidate UE group in the set of candidate UE groups according to the average basic transmission power $P_{avg}$ of all UEs in the cell.

The total transmission power of each candidate UE group may be calculated by:

$$P_{total}=P_{avg} \times \beta \times N \quad (1)$$

where N denotes a number of UEs in each candidate UE group, β is a compensation factor, configured for balancing a throughput of the cell and interference caused by the cell to its adjacent cell. In an example, β may be configured as an empirical value set by the system, for example, a certain value within [0.5, 1.2].

In block 1023, for each candidate UE group in the set of candidate UE groups, the base station lists up all possible transmission power allocation factors as a set of candidate transmission power allocation factors corresponding to each candidate UE group.

In an example, the number of factors in the set of candidate transmission power allocation factors is related with the number of UEs in its corresponding candidate UE group and a minimum granularity configured by the system for the transmission power allocation factor. For example, when the number of UEs in a candidate UE group is 2, the minimum granularity configured by the system for the transmission power allocation factor is 0.1, the set of candidate transmission power allocation factors include 9 transmission power allocation factors: {(0.1, 0.9), (0.2, 0.8), (0.3, 0.7), (0.4, 0.6), (0.5, 0.5), (0.6, 0.4), (0.7, 0.3), (0.8, 0.2) and (0.9, 0.1)}. The sum of all the elements in each transmission power allocation factor is 1.

In block 1024, the base station arranges and combines the candidate UE groups and the candidate transmission power allocation factors, and obtains all the combinations of a candidate UE group and a candidate transmission power allocation factor.

For example, assume there are 3 candidate UE groups (UE1, UE2), (UE1, UE3) and (UE2, UE3) in a subband 1. For each candidate UE group, there are 9 candidate transmission power allocation factors: (0.1, 0.9), (0.2, 0.8), (0.3, 0.7), (0.4, 0.6), (0.5, 0.5), (0.6, 0.4), (0.7, 0.3), (0.8, 0.2) and (0.9, 0.1). By arrangement and combination, 27 combinations of a candidate UE group and a candidate transmission power allocation factor are obtained in total, i.e., 27 ways of power allocation may be obtained.

In block 1025, for each combination of a candidate UE group and a candidate transmission power allocation factor, the base station allocates a power for each UE in the candidate UE group according to the candidate transmission power allocation factor.

In an example, the base station may determine a transmission power for each UE in the current candidate UE group according to the total transmission power of the current candidate UE group and the current candidate transmission power allocation factor. For example, assume the candidate UE group is (UE1, UE2) in a subband 1, the current candidate transmission power allocation factor is (0.3, 0.7), the transmission power for UE1 is $P_{UE1}=0.3 \times P_{total}$, the transmission power for UE2 is $P_{UE2}=0.7 \times P_{total}$.

In block 1026, the base station calculates a scheduling metric of the candidate UE group according to the allocated power, searches for a candidate UE group and its corresponding candidate transmission power allocation factor which achieve a maximum scheduling metric in the subband as the UE group scheduled in the current subband and its corresponding first transmission power allocation factor, respectively.

As described above, in the subband 1, a scheduling metric of each candidate UE group may be calculated respectively under 27 ways of power allocation, and a candidate UE group and its corresponding candidate transmission power allocation factor which may achieve a maximum scheduling metric is searched out. For example, the maximum scheduling metric corresponds to the candidate UE group (UE1, UE3) and the candidate transmission power allocation factor (0.3, 0.7). Thus, the UE group to be scheduled in the subband 1 is (UE1, UE3) and its corresponding first candidate transmission power allocation factor is (0.3, 0.7).

In specific, the above-described block 1026 may be implemented by the following steps.

In block 10261, the base station calculates a Signal to Noise Ratio (SNR) of each UE in the current candidate UE group according to the allocated power.

For example, if the current candidate UE group includes two UEs, UE1 and UE2, and the current candidate transmission power allocation factor is $(P_1, P_2)$, the SNR of the received signal of UE1 is given by the following expression (2):

$$SNR_1 = \frac{|h_1|^2 P_1 \cdot P_{total}}{|h_2|^2 P_2 \cdot P_{total} + N} \quad (2)$$

The base station may perform SIC processing for the received signal of UE2, and the post-processing SNR for UE2 is given by the following expression (3):

$$SNR_2 = \frac{|h_2|^2 P_2 \cdot P_{total}}{N} \quad (3)$$

where $h_1$ and $h_2$ denotes a uplink channel function of UE1 and UE2, respectively, N denotes the noise power.

In block 10262, according to the SNR of each UE in the current candidate UE group, the base station calculates a scheduling metric of the current candidate UE group.

In examples of the present disclosure, the above-described scheduling metric may be a Proportional Fair (PF) scheduling metric, an improved PF scheduling metric or a UE geometric mean throughput metric, etc.

In addition, in this block, the base station may calculate an instantaneous throughput of each UE in the current candidate UE group by using the current candidate transmission power allocation factor for power allocation according to the SNR of each UE in the current candidate UE group.

For example, for the kth UE in the candidate UE group, $UE_k$, the instantaneous throughput may be calculated by:

$$r_k = SE_k^{MCS} \times (1 - BLER)|_{SNR_k} \quad (4)$$

where $SNR_k$ denotes the SNR of the kth UE, $SE_k^{MCS}$ denotes the maximum spectrum efficiency achieved by a MCS selected for the UE in the subband under $SNR_k$, BLER denotes the BLock Error Rate (BLER) under $SNR_k$, $|_{SNR_k}$ denotes under the condition of $SNR_k$.

After the instantaneous throughput of each UE in the current candidate UE group is calculated, the scheduling metric of each UE in the current candidate UE group may be further calculated. By summing up the scheduling metric of each UE in the current candidate UE group, the scheduling metric of the current candidate UE group is obtained.

In specific, in the above-described example, the base station may calculate the scheduling metric of a candidate UE group by the following expression (5):

$$\Gamma_\Omega|_{(P_1,P_2)} = \sum_{k \in \Omega} \frac{r_k}{R_k} \quad (5)$$

where $\Omega$ denotes the current candidate UE group, k denotes the kth UE in the current candidate UE group, $r_k$ denotes the instantaneous throughput of the kth UE, and $R_k$ denotes the average throughput of the kth UE.

In block 10263, the base station compares the scheduling metrics of each candidate UE group when using different candidate transmission power allocation factors, and selects the candidate UE group and its corresponding candidate transmission power allocation factor $(P^*_1, P^*_2)$ which achieve a maximum scheduling metric $\Gamma^{Optimal}$ as the UE group scheduled in the current subband and its corresponding first transmission power allocation factor.

For example, the above-described selecting may be given by:

$$\Gamma^{Optimal}|_{(P^*_1,P^*_2)} = \arg\max_{\{(P_1,P_2)\}}\{\Gamma_\Omega|_{(P_1,P_2)}\} \quad (6)$$

Figure 3:
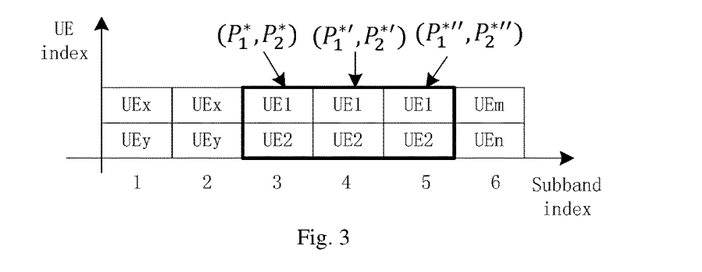
FIG. 3 is a schematic diagram illustrating a method for determining a UE group scheduled in each subband and a first transmission power allocation factor according to an example of the present disclosure.

FIG. 3 is a schematic diagram illustrating a method for determining a UE group scheduled in each subband and a first transmission power allocation factor according to an example of the present disclosure. As shown in FIG. 3, a UE group (UE1, UE2) is scheduled in 3 continuous subbands, i.e., indexes of 3, 4, and 5, respectively. In the subband with an index of 3, the first transmission power allocation factor corresponding to the UE group (UE1, UE2) is $(P^*_1, P^*_2)$. In the subband with an index of 4, the first transmission power allocation factor corresponding to the UE group (UE1, UE2) is $(P^{*\prime}_1, P^{*\prime}_2)$. In the subband with an index of 5, the first transmission power allocation factor corresponding to the UE group (UE1, UE2) is $(P^{*\prime\prime}_1, P^{*\prime\prime}_2)$.

After the above-described blocks are performed, the base station may determine a transmission power of each UE in the scheduled UE group according to the UE group scheduled in each subband, its corresponding first transmission power allocation factor, and a total transmission power in each subband. Then, the base station may further determine a MCS of UE in each subband, which may be called as a subband MCS, and notifies the scheduled UE the scheduling information, including the transmission power, the subband MCS and the allocated subband, etc. of the UE. Thus, the UE may transmit an uplink signal in the allocated subband using the allocated transmission power and MCS according to the scheduling information.

It can be seen that, according to the above-described method, the base station may perform UE scheduling and power allocation at the same time, i.e., determine the UE group scheduled in each subband and the transmission power of each UE in the scheduled UE group. That is, according to the above-described method, not only the total transmission power in each subband is determined, but also how to allocate power for UEs in the UE group in each subband is determined.

In the prior art, power allocation is first performed, and then UE scheduling is performed according to results of power allocation. In addition, power is allocated only according to the basic transmission power of each UE. Hence, in contrast to the prior art, in the above-described method according to the example of the present disclosure, a UE group scheduled in each subband and a first transmission power allocation factor are searched at the same time. When searching for the UE group scheduled in the subband and its corresponding first transmission power allocation factor, not only the channel conditions of UEs and difference between channels of UEs are considered, but also the scheduling metric of the scheduled UE group is also maximized. Hence, the system throughput can be improved from the whole system point of view.

In addition, It can be seen from the above-described method, in an example, the total transmission power in each subband $P_{total}$ determined according to the average basic transmission power $P_{avg}$ of all UEs in the whole cell, the number of UEs in the scheduled UE group and a compensation factor. Hence, the method for controlling a power provided by the examples of the present disclosure may control the fluctuation of total transmission power in each subband, and avoid a large fluctuation of total transmission power. For example, if the number of UEs in the scheduled UE group and the compensation factor are fixed, the total transmission power in each subband is fixed.

In order to further optimize the method for controlling a power as described above, another example of the present disclosure also provides a method for controlling a power. In the above-described expression (1), besides the empirical value, the compensation factor β may be adjusted dynamically by a sliding window mechanism, so that the total transmission power in each subband may be adjusted dynamically, and the system throughout may be optimized.

Figure 4:
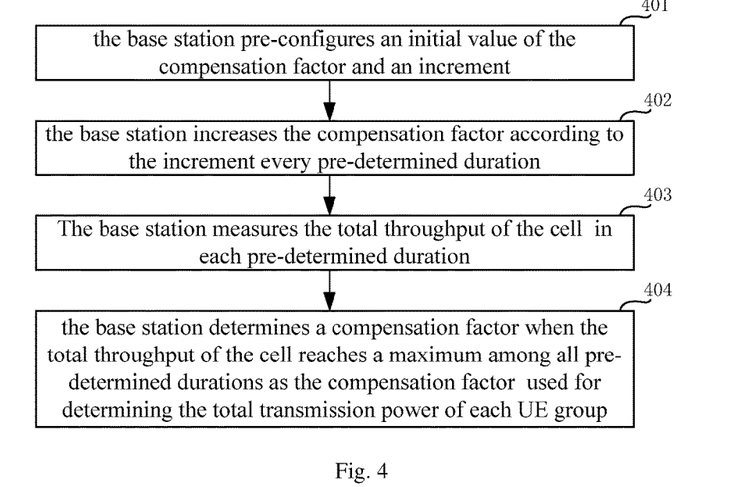
FIG. 4 is a flow chart illustrating a method for controlling a power according to another example of the present disclosure.

The example will be described in detail in combination with an accompanying drawing. FIG. 4 is a flow chart illustrating a method for controlling a power according to another example of the present disclosure. As shown in FIG. 4, the method includes the following procedure.

In block 401, the base station pre-configures an initial value of the compensation factor β and an increment Δ, where β denotes a factor configured for balancing the throughput of the cell and interference caused by the cell to its adjacent cell.

Figure 5:
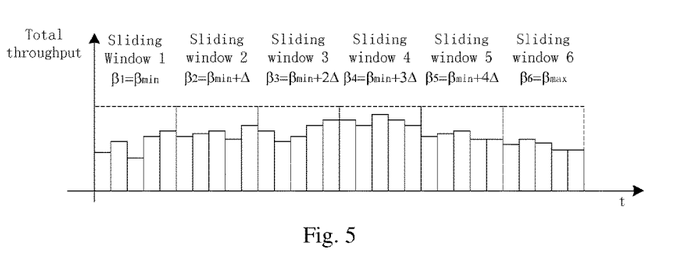
FIG. 5 is a schematic diagram illustrating a method for dynamically adjusting a compensation factor according to an example of the present disclosure.

In an example, the base station may pre-configure a minimum $\beta_{min}$ and a maximum $\beta_{max}$ of β. As shown in FIG. 5, $\beta_{max}-\beta_{min}=5\Delta$, and the initial value of β is $\beta_{min}$.

In block 402, the base station increases the compensation factor according to the increment every pre-determined duration (i.e., a length of the sliding window).

For example, let $\beta_{n+1}=\beta_n+\Delta$, where n denotes the index of the previous sliding window. As shown in FIG. 5, there are 6 sliding windows, and the length of each sliding window includes 5 Transmission Time Intervals (TTIs). Corresponding to each sliding window, the value of β is $\beta_1=\beta_{min}$, $\beta_2=\beta_{min}+\Delta$, $\beta_3=\beta_{min}+2\Delta$, $=\beta_{min}+3\Delta$, $\beta_5=\beta_{min}+4\Delta$, $\beta_6=\beta_{max}$, respectively.

In block 403, the base station measures the total throughput of the cell in each pre-determined duration.

In an example, the base station may measure the total throughput of the cell in each TTI according to the received uplink data. Specifically, the base station may detect the uplink data in each TTI, calculate the amount of data which is successfully detected in all subbands as the total throughput of the cell in each TTI. Then, the base station may average the total throughputs in all TTIs within a sliding window to obtain the total throughput of the cell in the sliding window. The total throughput may be a geometric mean user throughput.

In block 404, the base station determines a compensation factor when the total throughput of the cell reaches a maximum among all pre-determined durations as the compensation factor β used for calculating the total transmission power of each UE group.

As shown in FIG. 5, the total throughput of the cell in the sliding window with an index of 4 reaches a maximum, where the corresponding compensation factor $\beta_4=\beta_{min}+3\Delta$. Thus, $\beta_4$ is determined as the compensation factor β used for determining the total transmission power of each candidate UE group as in expression (1).

In an example of the present disclosure, the above-described method may be triggered by the system, i.e., all the base stations in the system may perform the above-described method at the same time. In another example of the present disclosure, it may be triggered periodically, i.e., in a certain period, all the base stations in the system may perform the above-described method at the same time.

Because the method is performed by all the base stations in the system at the same time, when the total transmission power of the cell increases, the total transmission power of the adjacent cell also increases. Hence, the compensation factor determined by each base station may consider both the throughput of itself and the interference caused to the adjacent cell. That is, according to the above-described method for dynamically adjusting the compensation factor β which influences the total transmission power in each subband, the value of the total transmission power in each subband may be further optimized on the basis of the value of β pre-determined by the system, so that a balance between the throughput of the cell and interference caused by the cell to its adjacent cell is achieved, and the total throughput of the system may be further optimized.

In the above-described example, the base station may determine a UE group scheduled in each subband and a corresponding first transmission power allocation factor, so the subband TPC is implemented, and further the subband MCS can be obtained. Since the base station is required to notify the scheduled UE the MCS and the transmission power allocation factor used in the allocated resources, when the subband MCS and the first transmission power allocation factor in each subband is feed back, the signaling overhead becomes high. In order to reduce the signaling overhead, when a same UE group is scheduled in multiple continuous subbands, a wideband MCS may be used, i.e., only one wideband MCS is used to transmit signal in all the continuous subbands. However, the wideband MCS is not matched with the subband TPC, so the wideband TPC is required.

Figure 6:
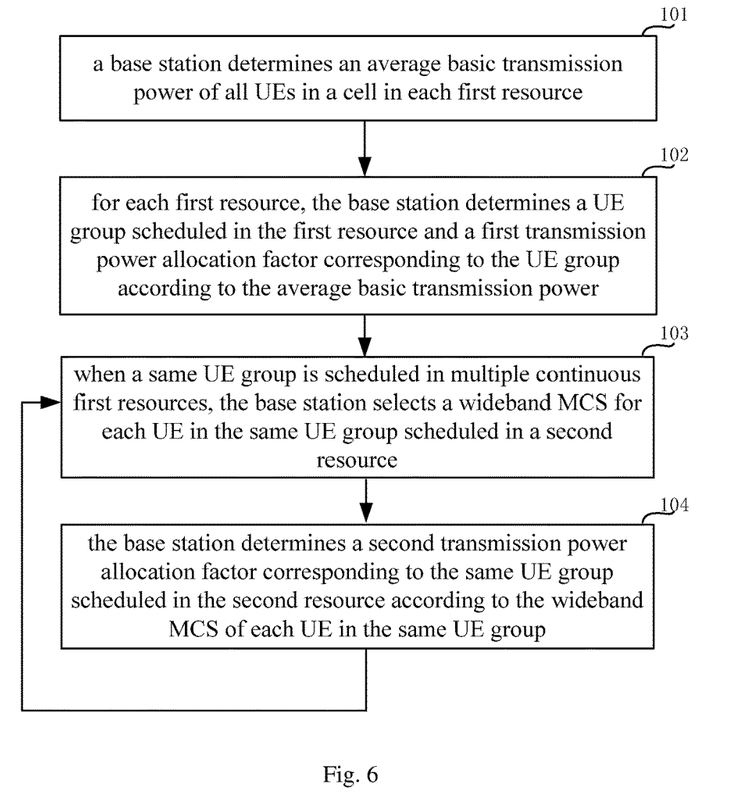
FIG. 6 is a flow chart illustrating a method for controlling a power according to yet another example of the present disclosure.

The example will be described in detail in combination with an accompanying drawing. FIG. 6 is a flow chart illustrating a method for controlling a power according to an example of the present disclosure. As shown in FIG. 6, the method includes the following procedure.

In block 101, a base station determines an average basic transmission power $P_{avg}$ of all UEs in a cell in each first resource.

In block 102, for each first resource, the base station determines a UE group scheduled in the first resource and a first transmission power allocation factor corresponding to the UE group according to the average basic transmission power $P_{avg}$.

Implementation of block 101 and block 102 may refer to the previous examples, which is not described in detail herein.

In block 103, when a same UE group is scheduled in multiple continuous first resources, the base station selects a wideband MCS for each UE in the same UE group scheduled in a second resource.

The second resource is composed of the multiple continuous first resources corresponding to the same UE group. For example, as shown in FIG. 3, a UE group (UE1, UE2) is determined for 3 continuous subbands with indexes of 3, 4, and 5. Thus, the second resource is composed of these three subbands with indexes of 3, 4, and 5.

Figure 7:
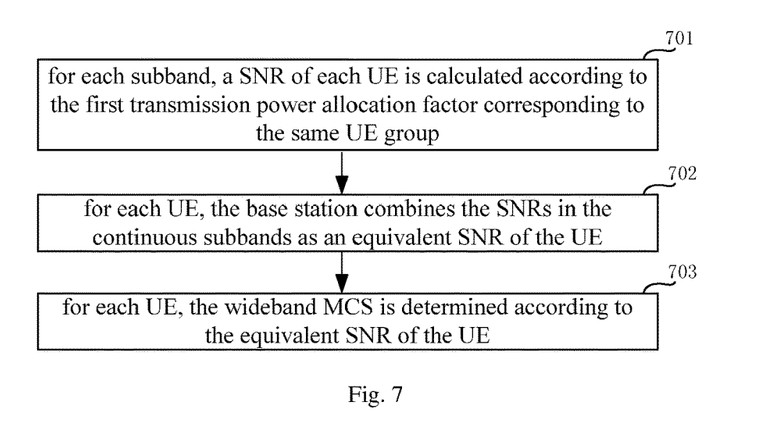
FIG. 7 is a flow chart illustrating a method for selecting a wideband MCS according to an example of the present disclosure.

FIG. 7 is a flow chart illustrating a method for selecting a wideband MCS according to an example of the present disclosure. As shown in FIG. 7, when the first resource is a subband, the method including the following procedure.

In block 701, for each subband, a SNR of each UE is calculated according to the first transmission power allocation factor corresponding to the same UE group.

The above-described calculation may refer to the above-described expressions (2) and (3).

In block 702, for each UE, the base station combines the SNRs in the continuous subbands as an equivalent SNR of the UE. The above-described combination may be performed by using the following expression (7):

$$\overline{SNR} = \frac{\left|\frac{1}{RB}\sum_{\{RB\}}(WH)_{n,n}\right|^2}{\frac{1}{RB}\sum_{\{RB\}}\sum_{m=0}^{m_r}(I+N)|W_{n,m}|^2 + \left\{\frac{1}{RB}\sum_{\{RB\}}|(WH)_{n,n}|^2 - \left|\frac{1}{RB}\sum_{\{RB\}}(WH)_{n,n}\right|^2\right\} + \frac{1}{RB}\sum_{\{RB\}}\sum_{i=0,i\neq n}^{S_t}|(WH)_{n,i}|^2} \quad (7)$$

where RB denotes the number of allocated Resource Blocks (RBs), and a subband may include multiple RBs; n denotes the index of RB; W denotes the weight of Minimum Mean Square Error (MMSE) processing at the receiver; H denotes the equivalent channel response, including the precoding processing; $m_r$ denotes the number of received antennas; $S_t$ denotes the number of data flows in a MIMO transmission; I denotes the interference from the adjacent cell; and N denotes the noise power.

Or, the equivalent SNR may be directly obtained by the linear average over the SNRs in the continuous subbands.

In block 703, for each UE, the wideband MCS is determined according to the equivalent SNR of the UE.

In block 104, the base station determines a second transmission power allocation factor corresponding to the same UE group scheduled in the second resource according to the wideband MCS of each UE in the same UE group.

The following will describe in detail the method for wideband TPC.

In the above-described block 102, the first transmission power allocation factor of UE is obtained by calculating the throughput and scheduling metric based on the assumption that the maximum spectrum efficiency of MCS can be achieved in the subband. The MCS obtained in block 103 is the wideband MCS, which is determined according to all the allocated subbands and is applied to all the allocated subbands. Hence, the wideband MCS is different from the subband MCS described in block 102. In order to optimize the performance of UE, the transmission power allocation factor is required to optimize in order to maximize the subband throughput and scheduling metric of the wideband MCS. In specific, assume the MCS of the UE is the wideband MCS obtained in block 103, the base station lists up all the candidate transmission power allocation factors again, selects a transmission power allocation factor which maximizes the scheduling metric of the UE group as the second transmission power allocation factor corresponding to the wideband.

Figure 8:
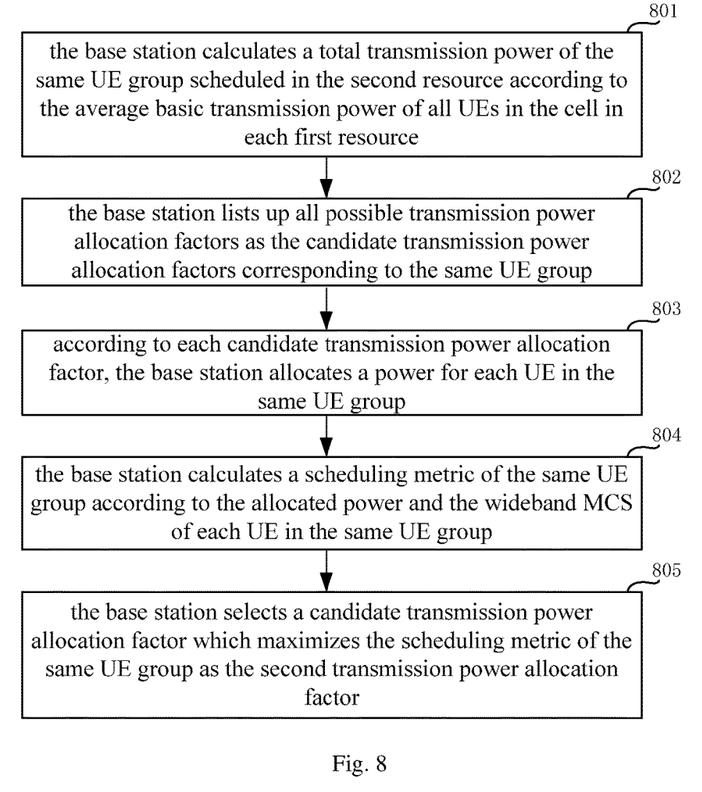
FIG. 8 is a flow chart illustrating a method for performing wideband TPC according to an example of the present disclosure.

FIG. 8 is a flow chart illustrating a method for performing wideband TPC according to an example of the present disclosure. As shown in FIG. 8, for the same UE group scheduled in the second resource, the wideband TPC includes the following steps.

In block 801, the base station calculates a total transmission power of the same UE group scheduled in the second resource according to the average basic transmission power of all UEs in the cell in each first resource.

In specific, assume the first resource is a subband, and the second resource is composed of all the continuous subbands where a same UE group is scheduled. For each subband in all the continuous subbands, the base station may calculate the total transmission power of the same UE group scheduled in the subband according to the average basic transmission power of all UEs in the cell in the subband, as described in block 1022. Then, the total transmission power of the same UE group in the second resource is obtained by summing the total transmission powers in all the continuous subbands.

In block 802, the base station lists up all possible transmission power allocation factors as the candidate transmission power allocation factors corresponding to the same UE group.

For example, the UE group scheduled in the wideband includes UE1 and UE2, and the minimum granularity configured by the system for the transmission power allocation factor is 0.1, the set of candidate transmission power allocation factors include: (0.1, 0.9), (0.2, 0.8), (0.3, 0.7), (0.4, 0.6), (0.5, 0.5), (0.6, 0.4), (0.7, 0.3), (0.8, 0.2) and (0.9, 0.1).

In block 803, according to each candidate transmission power allocation factor, the base station allocates a power for each UE in the same UE group. The implementation of the block 1043 may refer to description of block 1025.

In block 804, the base station calculates a scheduling metric of the same UE group according to the allocated power and the wideband MCS of each UE in the same UE group.

In an example, calculating a scheduling metric may refer to the method described in block 1026. But it should be noted that, the MCS of the UE is the wideband MCS obtained in block 103, but not the MCS which can achieve the maximum spectrum efficiency in the corresponding subband.

For example, the instantaneous throughput of the kth UE in the same UE group may be calculated according to the following expression (8):

$$r_k = SE_k^{MCS} \times (1-BLER)|_{SNR_k,MCS} \quad (8)$$

where $SE_k^{MCS}$ denotes the spectrum efficiency when using the wideband MCS obtained in the above-described block 103, BLER denotes the BLER obtained when using the wideband MCS under $SNR_k$, $|_{SNR_k,MCS}$ denotes under the condition of $SNR_k$. and using the wideband MCS.

After the instantaneous throughput of each UE in the same UE group is calculated, the scheduling metric of the same UE group scheduled in the wideband may be further calculated according to the above-described expression (5).

In block 805, the base station selects a candidate transmission power allocation factor which maximizes the scheduling metric of the same UE group as the second transmission power allocation factor.

For further optimization, the base station may repeat performing the block 103 and block 104 until a convergence is achieved. The criteria to determine whether the convergence is achieved includes: until in two adjacent calculation results, the wideband MCSs for the UE obtained in block 103 are the same; and/or, until in two adjacent calculation results, difference between two second transmission power allocation factors obtained in block 104 is lower than a first pre-determined threshold; and/or, until difference between two system throughputs is lower than a second pre-determined threshold, where two system throughputs are calculated according to the wideband MCSs obtained in block 103 and the second transmission power allocation factors obtained in block 104 in two adjacent calculation results, respectively.

After performing the above-described block, the base station may determine the wideband MCS and the second transmission power allocation factor for the same UE group scheduled in wideband, and notify the scheduled UE the scheduling information. The scheduling information may include an allowable transmission power determined according to the second transmission power allocation factor, the wideband MCS and the allocated wideband (i.e., multiple continuous subbands), etc. of the UE. Thus, the UE may transmit a signal in the allocated wideband using the allocated transmission power through wideband TPC and wideband MCS according to the scheduling information.

It can be seen that, after the block 103 of the example is finished, the wideband MCS is selected with respect to multiple continuous subbands allocated for the UE. In this way, the first transmission power allocation factor in each subband determined in the block 102 cannot achieve the best throughput in each subband. Hence, in the block 104 of the example, the transmission power allocation factor is further adjusted by the wideband TPC, so that the system throughput is optimized.

Corresponding to the above-described methods for controlling a power, an example of the present disclosure also provides an apparatus for controlling a power.

Figure 9:
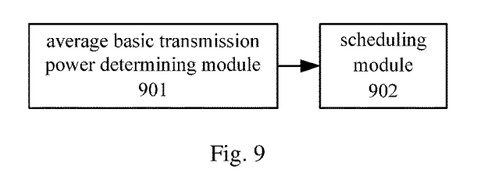
FIG. 9 is a schematic diagram illustrating an apparatus for controlling a power according to an example of the present disclosure.

FIG. 9 is a schematic diagram illustrating an apparatus for controlling a power according to an example of the present disclosure. As shown in FIG. 9, the apparatus comprises the following modules.

An average basic transmission power determining module 901 is configured to determine an average basic transmission power $P_{avg}$ of all UEs in a cell in each first resource.

As described above, the average basic transmission power determining module may use various methods to determine the average basic transmission power $P_{avg}$ of all UEs in the cell. For example, it may directly pre-determine the average basic transmission power $P_{avg}$ of all UEs in the cell; or, it may determine the average basic transmission power $P_{avg}$ of all UEs in the cell according to the method as described in blocks 1011-1012.

A scheduling module 902 is configured to for each first resource, determine a UE group scheduled in the first resource and a first transmission power allocation factor according to the average basic transmission power.

As described above, according to an example of the present disclosure, the scheduling module may determine a UE group scheduled in each subband and a corresponding transmission power allocation factor according to the method as described in blocks 1021-1026.

Figure 10:
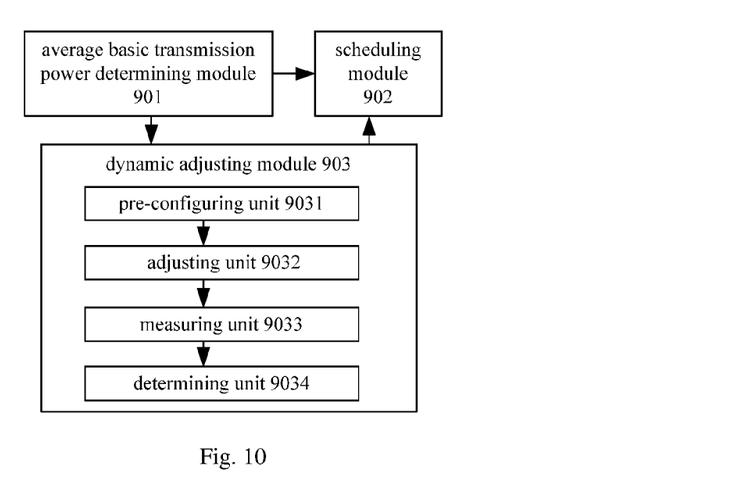
FIG. 10 is a schematic diagram illustrating an apparatus for controlling a power according to another example of the present disclosure.

As described above, in order to further optimize the method for controlling a power, yet another example of the present disclosure also provides an apparatus for controlling a power. As shown in FIG. 10, besides the average basic transmission power determining module 901 and the scheduling module 902, the apparatus further comprises a dynamic adjusting module 903, configured to determine a compensation factor.

Accordingly, the scheduling module 902 is configured to determine the UE group scheduled in the first resource and the first transmission power allocation factor corresponding to the UE group according to the average basic transmission power and the compensation factor.

The dynamic adjusting module 903 may comprise:
a pre-configuring unit 9031, configured to pre-configure an initial value of the compensation factor $\beta$ and an increment $\Delta$;
an adjusting unit 9032, configured to increase the compensation factor according to the increment every pre-determined duration (i.e., a length of the sliding window), i.e., perform $\beta=\beta+\Delta$;
a measuring unit 9033, configured to measure a total throughput of the cell in each pre-determined duration; and
a determining unit 9034, configured to determine a compensation factor used when the total throughput of the cell reaches a maximum among all pre-determined durations as the compensation factor $\beta$ used for calculating the total transmission power of each UE group.

Figure 11:
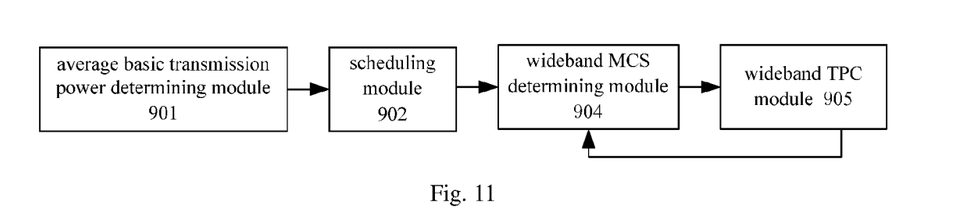
FIG. 11 is a schematic diagram illustrating an apparatus for controlling a power according to yet another example of the present disclosure.

In order to further optimize the method for controlling a power as described above, yet another example of the present disclosure also provides an apparatus for controlling a power. As shown in FIG. 11, besides the average basic transmission power determining module 901 and the scheduling module 902, when a same UE group is scheduled in multiple continuous first resources, the apparatus further comprises:

a wideband MCS determining module 904, configured to select a wideband MCS for each UE in the same UE group scheduled in a second resource, wherein the second resource is composed of the multiple continuous first resources; and a wideband TPC module 905, configured to determine a second transmission power allocation factor corresponding to the same UE group scheduled in the second resource according to the wideband MCS of each UE in the same UE group.

As described above, the wideband TPC module 905 may perform the wideband TPC according to the method as described in blocks 801-805.

Figure 12:
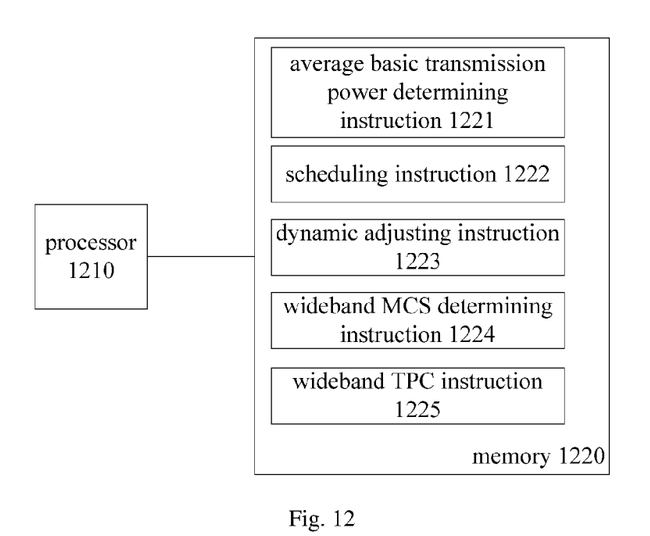
FIG. 12 is a schematic diagram illustrating a structure of a base station according to an example of the present disclosure.

FIG. 12 is a schematic diagram illustrating a structure of a base station according to another example of the present disclosure. As shown in FIG. 12, the base station comprises a processor 1210 and a memory 1220 communicated with the processor 1210; in the memory 1220, the instructions that are executed by the processor 1210 are stored, comprising an average basic transmission power determining instruction 1221, a scheduling instruction 1222, a dynamic adjusting instruction 1223, a wideband MCS determining instruction 1224, and a wideband TPC instruction 1225.

The average basic transmission power determining instruction 1221 indicates to determine an average basic transmission power of all UEs in a cell in each first resource.

The scheduling instruction 1222 indicates to for each first resource, determine a UE group scheduled in the first resource and a first transmission power allocation factor according to the average basic transmission power.

The dynamic adjusting instruction 1223 indicates to determine a compensation factor.

The wideband MCS determining instruction 1224 indicates to select a wideband MCS for each UE in the same UE group scheduled in a second resource, wherein the second resource is composed of the multiple continuous first resources.

The wideband TPC instruction 1225 indicates to determine a second transmission power allocation factor corresponding to the same UE group scheduled in the second resource according to the wideband MCS of each UE in the same UE group.

Operations indicated by these instructions are similar to the above-described corresponding methods and modules, which are not described in detail herein.

It can be seen from the above-described method and apparatus for controlling a power, examples of the present disclosure may determine a UE group scheduled in each subband and a transmission power for each UE in the UE group for each base station, provide a solution for controlling a transmission power in a NOMA system, and a better system throughput can be obtained.

The foregoing is preferred examples of the present disclosure, which is not used for limiting the protection scope of the present disclosure. Any modifications, equivalent substitutions and improvements made within the spirit and principle of the present disclosure, should be covered by the protection scope of the present disclosure.

What is claimed is:

1. A method for controlling uplink transmission power, comprising:
for each resource of a plurality of resources, determining an average basic transmission power of all User Equipments (UEs) in a cell;
for a first resource in the plurality of resources, determining a UE group scheduled in the first resource and a first transmission power allocation factor corresponding to the UE group according to the average basic transmission power;
wherein determining the UE group scheduled in the first resource and the first transmission power allocation factor corresponding to the UE group comprises:
listing up all possible UE combinations as a set of candidate UE groups;
for each candidate UE group in the set of candidate UE groups, calculating a total transmission power according to the average basic transmission power a number of UEs in the candidate UE group and a compensation factor;
for each candidate UE group in the set of candidate UE groups, listing up all possible transmission power allocation factors as a set of candidate transmission power allocation factors corresponding to each candidate UE group;
arranging and combining the candidate UE groups and the candidate transmission power allocation factors, and obtaining all combinations of a candidate UE group and a candidate transmission power allocation factor;
for each combination of a candidate UE group and a candidate transmission power allocation factor, determining a transmission power allocated to each UE in the candidate UE group according to the total transmission power of the candidate UE group and the candidate transmission power allocation factor, and calculating a scheduling metric of the candidate UE group according to the allocated power;
determining a candidate UE group and a corresponding candidate transmission power allocation factor which achieve a maximum scheduling metric in the first resource as the UE group scheduled in the first resource and its corresponding first transmission power allocation factor, respectively.

2. The method of claim 1, wherein determining the average basic transmission power of all UEs in the cell in each first resource comprises:
for each first resource, determining a basic transmission power of each UE in the first resource;
dividing a sum of the basic transmission power of all UEs in the cell by a number of all UEs in the cell to obtain the average basic transmission power in the first resource.

3. The method of claim 2, wherein determining the basic transmission power of each UE in the first resource comprises: using a Fractional Transmission Power Control (FTPC) to determine the basic transmission power of each UE.

4. The method of claim 1, wherein calculating the total transmission power of the candidate UE group according to the average basic transmission power, the number of UEs in the candidate UE group and the compensation factor comprises:

calculating the total transmission power by $P_{total}=P_{avg} \times \beta \times N$, wherein N denotes the number of UEs in the candidate UE group, $\beta$ is the compensation factor, $P_{avg}$ denotes the average basic transmission power.

5. The method of claim 4, further comprising:
pre-configuring an initial value of the compensation factor and an increment;
increasing the compensation factor according to the increment every pre-determined duration;
measuring a total throughput of the cell in each pre-determined duration; and
determining a compensation factor used when the total throughput of the cell reaches a maximum among all pre-determined durations as the compensation factor used for calculating the total transmission power of each candidate UE group.

6. The method of claim 1, wherein calculating a scheduling metric of the candidate UE group according to the allocated power comprises:
calculating a Signal to Noise Ratio (SNR) of each UE in the candidate UE group according to the allocated power; and
calculating a scheduling metric of the candidate UE group according to the SNR of each UE in the candidate UE group.

7. The method of claim 6, wherein the scheduling metric is one of a Proportional Fair (PF) scheduling metric, an improved PF scheduling metric or a UE geometric mean throughput metric.

8. The method of claim 1, when a same UE group is scheduled in multiple continuous first resources, the method further comprising:
selecting a wideband Modulation and Coding Scheme (MCS) for each UE in the same UE group scheduled in a second resource, wherein the second resource is composed of the multiple continuous first resources, and obtaining one wideband MCS; and
determining a second transmission power allocation factor corresponding to the same UE group scheduled in the second resource according to the wideband MCS of each UE in the same UE group, and obtaining one transmission power allocation factor.

9. The method of claim 8, further comprising:
after performing the process of determining the second transmission power allocation factor corresponding to the same UE group scheduled in the second resource according to the wideband MCS of each UE in the same UE group, returning to perform the process of selecting the wideband MCS for each UE in the same UE group scheduled in the second resource and determining the second transmission power allocation factor corresponding to the same UE group scheduled in the second resource according to the wideband MCS of each UE in the same UE group, and obtaining another wideband MCS and another transmission power allocation factor, respectively;
the one wideband MCS and the another wideband MCS are the same, stop the process of returning;
or, if difference between the one transmission power allocation factor and the another transmission power allocation factor is lower than a first pre-determined threshold, stop the process of returning;
or, if difference between two system throughputs is lower than a second pre-determined threshold, stop the process of returning, where two system throughputs are calculated according to the one wideband MCS and the one transmission power allocation factor, and the another wideband MCS and the another transmission power allocation factor, respectively.

10. The method of claim 8, wherein determining a second transmission power allocation factor corresponding to the same UE group scheduled in the second resource according to the wideband MCS of each UE in the same UE group comprises:

calculating a total transmission power of the same UE group scheduled in the second resource according to the average basic transmission power of all UEs in the cell in each first resource;

listing up all possible transmission power allocation factors as candidate transmission power allocation factors corresponding to the same UE group;

according to each candidate transmission power allocation factor, allocating a power for each UE in the same UE group, and calculating a scheduling metric of the same UE group according to the allocated power and the wideband MCS of each UE in the same UE group; and selecting a candidate transmission power allocation factor which maximizes the scheduling metric of the same UE group as the second transmission power allocation factor.

11. The method of claim 8, wherein selecting the wideband MCS for each UE in the same UE group scheduled in the second resource comprises:

for each first resource of the multiple continuous first resources, calculating a Signal to Noise Ratio (SNR) for each UE according to the first transmission power allocation factor corresponding to the same UE group;

for each UE, combining SNRs in the multiple continuous first resources to obtain an equivalent SNR of the UE, and selecting the wideband MCS according to the equivalent SNR.

12. A base station for controlling uplink transmission power, comprising a processor and a memory communicated with the processor; wherein in the memory, instructions that are executed by the processor are stored, comprising an average basic transmission power determining instruction and a scheduling instruction, wherein the average basic transmission power determining instruction indicates to for each first resource of a plurality of first resources, determine an average basic transmission power of all UEs in a cell;

the scheduling instruction indicates to for a first resource, determine a UE group scheduled in the first resource and a first transmission power allocation factor according to the average basic transmission power;

wherein the scheduling instruction indicates to list up all possible UE combinations as a set of candidate UE groups;

for each candidate UE group in the set of candidate UE groups, calculate a total transmission power according to the average basic transmission power a number of UEs in the candidate UE group and a compensation factor;

for each candidate UE group in the set of candidate UE groups, list up all possible transmission power allocation factors as a set of candidate transmission power allocation factors corresponding to each candidate UE group;

arrange and combine the candidate UE groups and the candidate transmission power allocation factors, and obtain all combinations of a candidate UE group and a candidate transmission power allocation factor;

for each combination of a candidate UE group and a candidate transmission power allocation factor, determine a transmission power allocated to each UE in candidate UE group according to the total transmission power of the candidate UE group and the candidate transmission power allocation factor, and calculate a scheduling metric of the candidate UE group according to the allocated power;

determine a candidate UE group and a corresponding candidate transmission power allocation factor which achieve a maximum scheduling metric in the first resource as the UE group scheduled in the first resource and its corresponding first transmission power allocation factor, respectively.

13. The base station of claim 12, wherein the instructions further comprises a wideband Modulation and Coding Scheme (MCS) determining instruction and a wideband Transmission Power Control (TPC) instruction, wherein the wideband MCS determining instruction indicates to select a wideband MCS for each UE in the same UE group scheduled in a second resource, wherein the second resource is composed of multiple continuous first resources;

the wideband TPC instruction indicates to determine a second transmission power allocation factor corresponding to the same UE group scheduled in the second resource according to the wideband MCS of each UE in the same UE group.

* * * * *